Figures 1, 2:
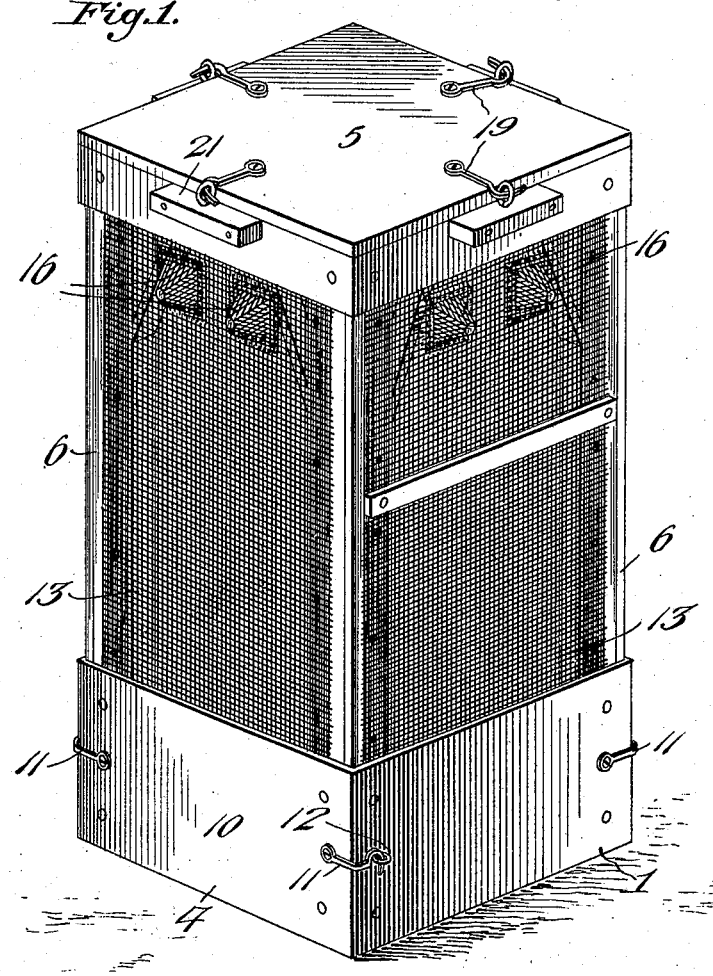

No. 867,423. PATENTED OCT. 1, 1907.
J. H. RUPE.
MEANS FOR CLEARING BEES FROM SUPERS WHEN TAKING SURPLUS HONEY.
APPLICATION FILED DEC. 1, 1905.

2 SHEETS—SHEET 1.

Witnesses: Inventor:

No. 867,423. PATENTED OCT. 1, 1907.
J. H. RUPE.
MEANS FOR CLEARING BEES FROM SUPERS WHEN TAKING SURPLUS HONEY.
APPLICATION FILED DEC. 1, 1905.
2 SHEETS—SHEET 2.
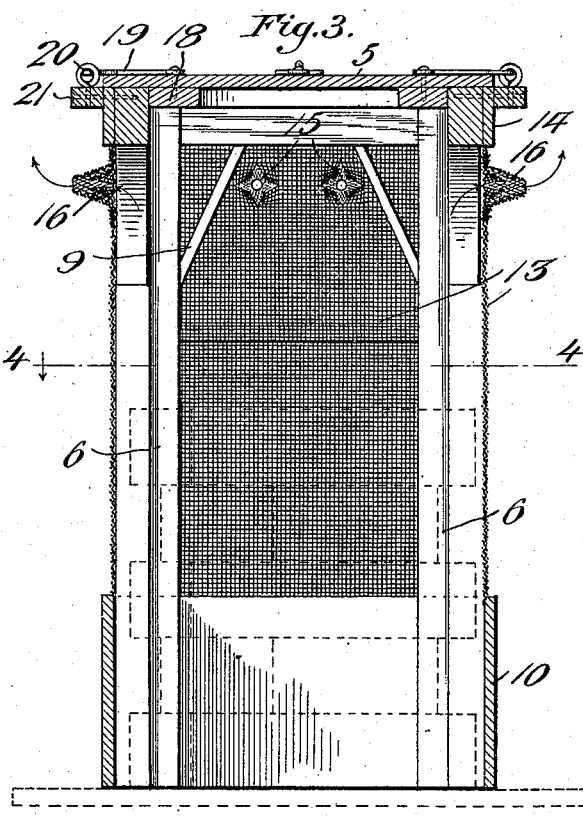
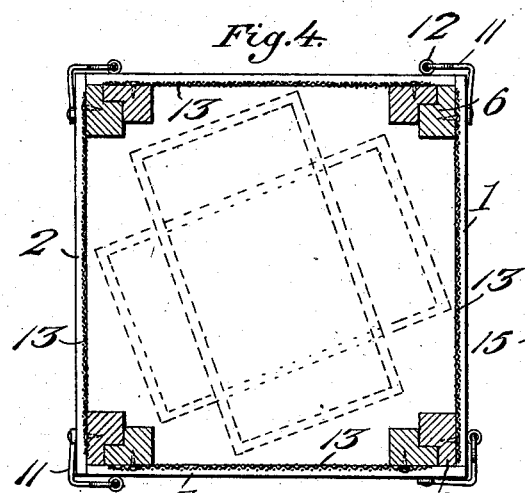
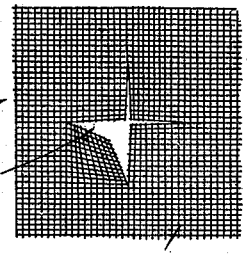
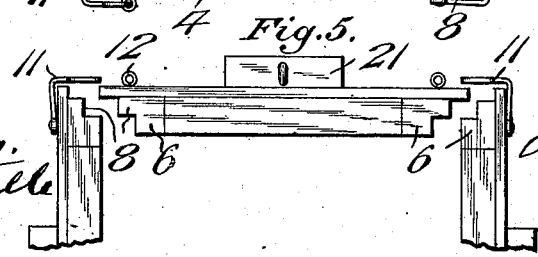
Witnesses:
Inventor:
John H. Rupe

UNITED STATES PATENT OFFICE.

JOHN H. RUPE, OF WILLIAMSBURG, KANSAS.

MEANS FOR CLEARING BEES FROM SUPERS WHEN TAKING SURPLUS HONEY.

No. 867,423.  Specification of Letters Patent.  Patented Oct. 1, 1907.

Application filed December 1, 1905. Serial No. 289,913.

*To all whom it may concern:*

Be it known that I, JOHN H. RUPE, a citizen of the United States, residing at Williamsburg, in the county of Franklin and State of Kansas, have invented a new and original Improvement in Means for Clearing Bees from Supers when Taking Surplus Honey, of which the following is a specification.

The invention relates to an improvement in bee culture and particularly to a means for clearing the bees from the supers in taking surplus honey.

The main object of the present invention is the production of a bee clearing device so arranged as to provide for the reception of a plurality of supers, and constructed to permit the ready and convenient escape of bees therefrom without possibility of their reëntry.

The invention will be described in the following specification, reference being had particularly to the accompanying drawings, in which:

Figure 1 is a perspective of the bee clearing device constructed in accordance with my invention, Fig. 2 is a bottom perspective of the cover therefor, Fig. 3 is a vertical section of the bee clearing device showing a plurality of supers therein, Fig. 4 is a section on the line 4—4 of Fig. 3, Fig. 5 is an elevation showing the cover and side walls slightly separated, illustrating particularly the medium of connection between these parts, Fig. 6 is an elevation showing the initial formation of the bee escape, the guard being omitted.

Referring particularly to the drawings, wherein similar reference numerals indicate like parts throughout the several views, my improved bee clearing device comprises side walls 1 and 2, end walls 3 and 4, and a cover or top 5. The side and end walls are practically duplicates in construction and a detailed description of one will suffice for all. Each wall comprises vertical frame bars 6 extending in spaced parallel relation and united at their top by cross bars 7. The relatively outer edges of the side bars 6 are reduced in thickness to provide tenons 8 designed to interlock with similar tenons of the adjacent walls in assembling the parts, as clearly shown in Fig. 4. The side bars 6 and cross bars 7 are further connected near their upper ends through the medium of inclined brace bars 9, which extend from the relatively inner surface of the side bars 6 to the relatively lower surface of the cross bars 7. The brace bars 9 are approximately equal in width to the thickness of the respective side and cross bars, and in addition to their bracing function provide for guiding the bees to the bee escapes in a manner to be later described.

Near the lower ends the side bars 6 are united on their outer sides by base plates 10, which extend from the lower ends of said side bars for a portion of their length. Plates 10 serve when the walls are assembled to provide a complete inclosure at the bottom of the bee clearing device, the plate of each wall being formed to permit a locking connection with the plate of the adjacent wall. For this purpose the plate 10 of one wall will be provided with a hook 11, bent at right angles to engage an eye 12 formed in the adjacent wall. Above the plates 10 the space between the side bars 6 of each wall is covered by a strip of metal screening 13 or the like, this strip preferably depending below the upper edge of the particular plate 10 and extending above the lower edge of the sealing strip 14 is secured on the outer side of the bars 6 adjacent their upper ends.

Each wall is formed with two bee escapes, which are located within the plane of and between the inclined brace bars 9. These bee escapes are formed by cutting the material of the screening strip in two lines at right angles, as shown at 15 in Fig. 6, and bending the cut portions outward from the plane of the strip, thereby providing an opening in the strip. Overlying the opening is what I term a guard comprising a conical section of screening material 16 of a size to overlie and conceal the opening 15, the apex of the guard being cut away to provide a circular opening of a size to permit the ready passage of a bee. The relatively inner edges of the guard are bent laterally and secured to the surface of the screen strip 13, whereby to surround the opening 15 with a guard to permit the ready passage of the bees therefrom and prevent their return.

The cover of the bee clearing device comprises a plate 17 having a depending rectangular section 18 designed to fit snugly between the cross bars 7 of the walls when the parts are assembled. The upper surface of the cover is provided with a series of hooks 19 designed to engage eyes 20 carried by guard blocks 21 secured to the sealing strips 14, guard blocks being of sufficient projection from the face of said strips as to protect the bee escapes when the parts of the clearing device are in knockdown condition for shipment, as will be obvious.

In use a number of supers with the bees are collected and set alternately in cross relation, as shown in the drawings, the bee clearing device in assembled form is placed over the collected supers, and the bees will readily find their way through the bee escapes and back to the hive.

In the use of the invention a number of supers are cleared at one time and without danger to the bee keeper.

As the natural trend of the bees to escape is upward, the brace bars 9 through their inclination and position relative to the bee escapes serve to direct the bees toward the escapes through which they may readily find their way, as stated.

The device as a whole is readily assembled when desired for use, and may be packed into small and convenient form for shipment.

In packing the device for shipment the four side walls 1 are assembled in respectively reverse and superimposed relation, two of the sides being arranged with bee escapes at opposite ends and toward each other, the remaining two being similarly arranged and supported on top of the first two. Side cleats are secured to the package thus provided and the top or cover 5 of the device is secured upon the uppermost side, or between any two of the sides, as shown. A small and convenient package is thus provided to facilitate shipping of the device, it being particularly noted that the end posts serve to so separate the sides of each pair as to thoroughly protect the bee escape cones from damage.

While preferring the construction herein shown and described, it is to be understood that I do not limit myself specifically thereto, as various changes and modifications may be resorted to without affecting the function and operation of the device, and, therefore, all such changes and variations as may fall within the scope of the appended claims are to be considered as within the spirit of the present invention.

Having thus described the invention what is claimed as new, is:—

1. A bee clearing device comprising duplicate side and end walls, means for securing said walls together, and a top connected to the upper end of the walls, each of said walls being formed with a plurality of bee escapes having a plurality of spaced walls.

2. A bee clearing device comprising duplicate side and end walls, each formed for a portion of its length of screening material, said material being cut and bent to provide an opening, and a bee guard of conical form and having an outlet at the apex, said guard overlying the opening formed in the screening material.

3. A bee clearing device comprising a plurality of walls, latch members for detachably securing said walls together, a cover removably secured to the upper ends of the walls, bee escapes formed in the respective walls, and means carried by the walls to direct the bees toward said escapes.

4. A bee escape for bee clearing devices consisting of a conical guard secured to one wall of the device and overlying an opening formed in the wall, said opening having projecting walls disposed within the guard.

5. A bee escape for bee clearing devices having a screen wall consisting of a conical guard overlying an opening formed in the screen wall, the material of the wall surrounding the opening being projected within the conical guard.

6. A bee escape for bee clearing devices having a screen wall consisting of a conical guard overlying an opening formed in the screen wall, the material of the wall surrounding the opening being projected within the conical guard and spaced from the inner surface of said guard.

JOHN H. RUPE.

Witnesses:
S. B. WEIDNER,
R. G. WARWICK.